Figure 1:
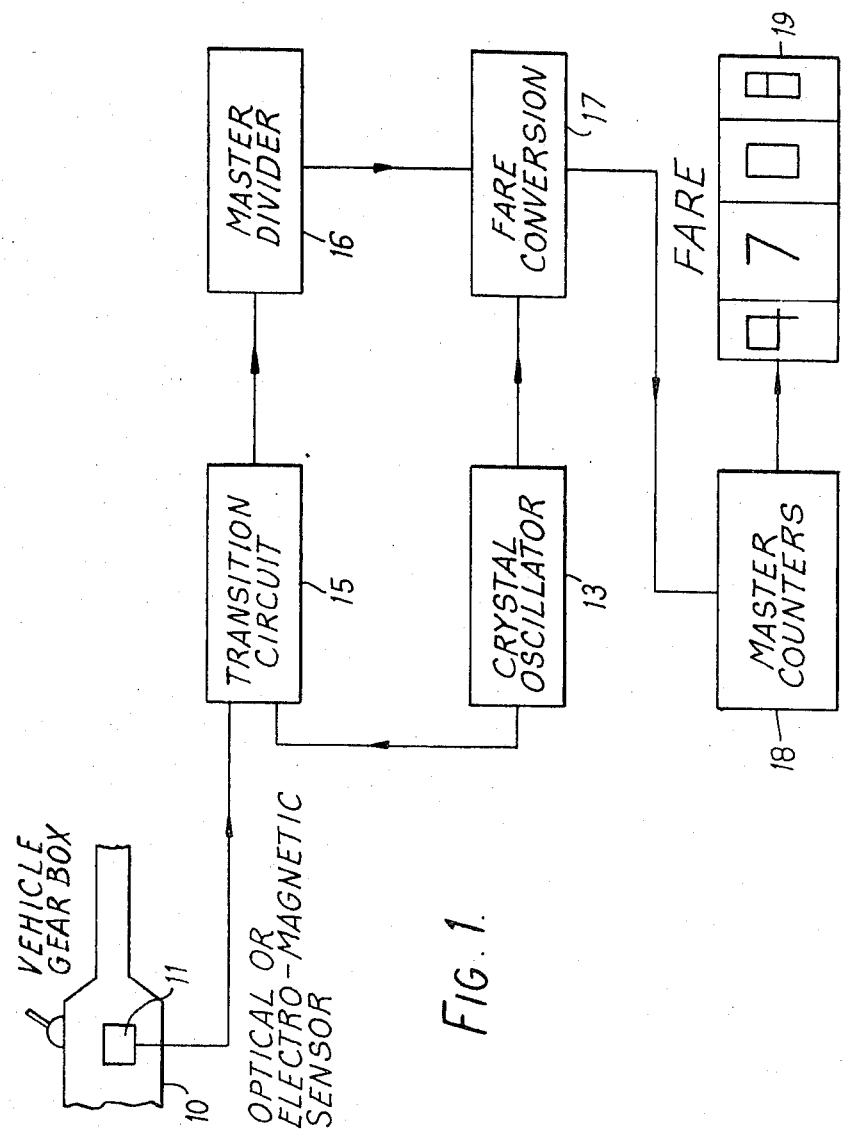

United States Patent [19]
Craddock

[11] 3,843,869
[45] Oct. 22, 1974

[54] TAXIMETERS
[75] Inventor: Michael John Craddock, Kenton, England
[73] Assignee: Geecen Limited, London, England
[22] Filed: May 24, 1973
[21] Appl. No.: 363,331

[30] Foreign Application Priority Data
June 8, 1972 Great Britain.................. 26875/72

[52] U.S. Cl............................................ 235/30 R
[51] Int. Cl. .......................................... G07b 13/10
[58] Field of Search .................................. 235/30 R

[56] References Cited
UNITED STATES PATENTS
3,157,352 11/1964 Caywood .......................... 235/30 R
3,388,859 6/1968 Kelch et al......................... 235/30 R
3,512,706 5/1970 Bruce-Sanders.................. 235/30 R
3,703,985 11/1972 Berg.................................. 235/30 R Primary Examiner—Stephen J. Tomsky
Attorney, Agent, or Firm—William Anthony Drucker

[57] ABSTRACT

The invention provides a taximeter having means for providing two sets of electrical pulses corresponding to distance travelled and time and electronic means whereby one set alone operates a fare indicator below a predetermined vehicle speed and the other set alone operates the fare indicator above that speed.

1 Claim, 2 Drawing Figures

TAXIMETERS

This invention relates to taximeters. A taximeter is normally provided with a rotary shaft connected with the gearbox of a vehicle to provide a measurement of distance travelled and with a clock to provide a measurement of hired time while waiting or driving below a predetermined speed, and with means whereby a fare indicator is operated according to distance when travelling above said speed and according to time when stationary or travelling below said speed.

In the specification of British Pat. No. 1,129,344 (Kienzle Apparate GmbH) it has been proposed to provide electronic means whereby pulses are provided representing a measurement of distance and time and all the pulses of one kind are utilised continuously for actuating the fare indicator and additional pulses of the other kind are also utilised for additionally actuating the fare indicator at appropriate conditions.

Also in the specification of British Pat. application 1,240,325 (Bruce-Sanders) it has been proposed to utilise two kinds of pulse for time and distance and to provide means whereby all the time pulses cease to operate the fare indicator when the vehicle is moving during which condition the distance pulses alone operate the fare indicator.

An object of the present invention is to provide electronic means whereby the time and distance are more positively utilised.

According to the invention a taximeter includes means for producing two sets of electrical pulses representing time and distance respectively and electronic means whereby time pulses are utilised for operating a fare indicator below a predetermined vehicle speed while the distance pulses are blocked, and distance pulses are utilised for operating the fare indicator above that speed while the time pulses are blocked.

The electronic means may include a time pulse counter, a distance pulse counter, means whereby each counter continuously resets the other, two AND gates one for each kind of pulse, latching means connected to one input of each of said AND gates for applying a control signal to one input of that AND gate which corresponds to the faster of the two pulses, and two bypass connections which are in parallel with the counters and latching means and connected to the other inputs of the AND gates whereby the latter pass the time and distance pulses to the fare indicator.

The latching means may include a time pulse inverter, a distance inverter, two NAND or NOR gates one for each inverter, the inverters being connected from the counters to an input of each of the NAND (or NOR) gates respectively, and connections from the output of each NAND (or NOR) gate to an input of the other.

Figure 2:
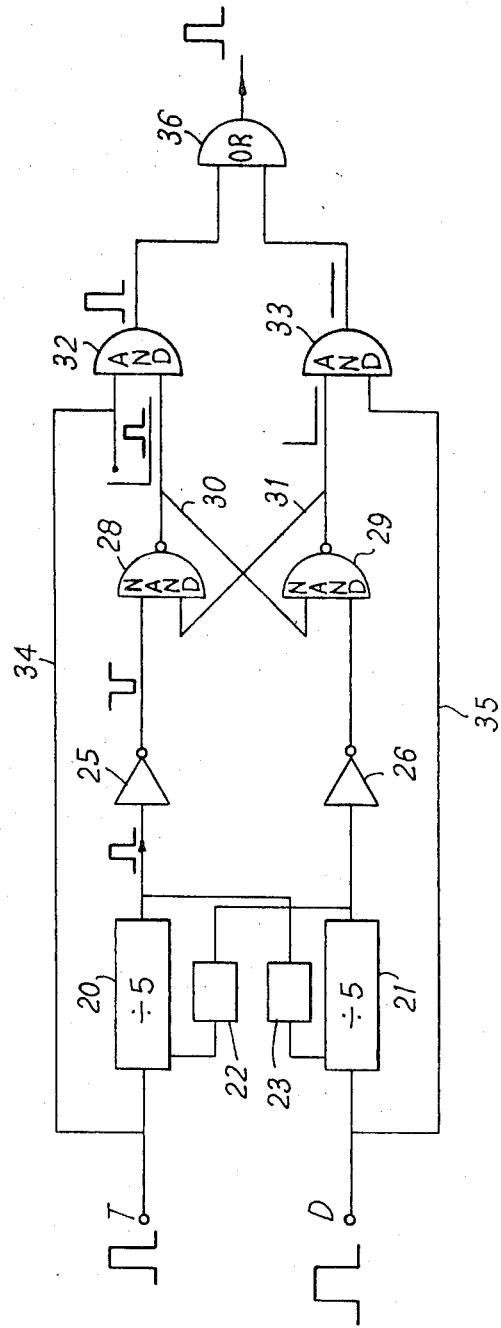

A constructional form of the invention will now be described by way of example with reference to the accompanying diagrammatic drawings wherein:

FIG. 1 is a block diagram of a taximeter fare indicator system made in accordance with the invention; and FIG. 2 is a circuit diagram of part of the system shown in FIG. 1.

In FIG. 1 a taxi gearbox is shown at 10. The speedometer drive of the gearbox operates a distance pulse generator 11 which generates electrical pulses which are directly proportional to the distance travelled by the taxi. A crystal oscillator 13 generates electrical pulses proportional to time. The pulses produced by the pulse generators 11, 13 are fed to an electronic means or "transition circuit" 15 which allows the faster of the two sets of pulses to pass on to a master pulse divider 16 which may be a binary counter dividing by four or five decades e.g., it may divide the pulses by 2,556 for London tariff or by any other required number according to the required tariff. The pulses for the divider 16 and pulses for the time pulse generator 13 are both fed to a fare conversion device 17 which may be a mono stable device which passes the required number of oscillator pulses according to the tariff e.g., for each pulse received from the master divider 16 the monostable device 17 may pass three of the oscillator pulses representing a fare increment of 3p. The pulses from the device 17 are fed to a master counter 18 which gives out pulses suitable for advancing a fare indicator 19 at the appropriate intervals. The master counter 18 may be binary devices each counting 1 decade.

FIG. 2 shows details of the transition circuit 15.

A pulse from the oscillator 13 representing time is applied at T and a pulse from the generator 11 representing distance, in yards or metres, is applied at D. A given number of time pulses is equivalent to the same number of distance pulses in fare value, e.g., for London tariff an increment of 3p. corresponds to 2,556 pulses which is equivalent to 450 yards or 2.5 minutes. It is desired that time pulses only shall be utilised below 6.14 m.p.h. and distance pulses only shall be utilised above this speed. These figures will however vary according to conditions and regulations existing at any period in different localities.

The two sets of pulses are fed respectively to counters 20, 21. The output from each of the counters is fed to the other via monostable devices 22, 23 so that each counter continuously resets the other i.e. the counter which is receiving the faster pulses will give output pulses while the other counter is continuously reset to zero thereby blocking the pulses from the latter counter. These outputs are connected by inverters 25, 26 to an input of each of two NAND gates 28, 29 (which can be replaced by NOR gates). The outputs of the NAND gates are connected by connections 30, 31 to the NAND gates so that the output of each NAND gate is connected to the other input of the opposite NAND gate. This forms a latching circuit such that when one NAND gives an output signal, the other gate gives no output signal. The outputs of the NAND gates are also connected respectively to one of each inputs of two AND gates 32, 33 while the other inputs of these AND gates are connected by by-pass connections 34, 35 to the inputs to the counters i.e., so as to by-pass the counters and latching circuit. Thus pulses from T and D are passed directly to the AND gates and the faster of the two pulses is passed by the corresponding AND gate to the fare indicator via an OR gate 36 to the master divider 16.

The distance pulses may be produced photoelectrically by a reed relay as described in specification 1,240,325 or by means of a wheel of ferrous metal having gaps in its periphery rotating adjacent a magnet wound with a coil in which the pulses are produced.

I claim:

1. In a taximeter having a fare indicator and time pulse means and distance pulse means for providing two sets of electrical pulses representing time and distance respectively, the provision of electronic means whereby time pulses are utilised for operating the fare indicator below a predetermined vehicle speed, while the distance pulses are blocked and distance pulses are utilised for operating the fare indicator above that speed while the time pulses are blocked and fare indicator operating means (16, 17, 18) for utilising the output pulses from said electronic means for operating the fare indicator; said electronic means comprising two counters receiving the time and distance pulses respectively, resetting means (22, 23) whereby the output from each counter resets the other counter, two inverters (25, 26) inverting the pulses from the counters respectively, a latching circuit connecting the two outputs from the inverters, said latching circuit including a plurality of first gating means (28, 29) whereby each gate passes a pulse when no pulse is given out by the other, by-pass means (34, 35) for by-passing the counters and inverters and latching means and feeding time and distance pulses to further gating means to enable them to give out pulses, said further gating means (32, 33, 36) receiving pulses from the first gating means and passing pulses to said fare indicator operating means.

* * * * *